United States Patent [19]

Kiyoto et al.

[11] 3,863,253

[45] Jan. 28, 1975

[54] MULTIPLE FREQUENCY DOPPLER RADAR SYSTEM FOR VEHICLE PASSENGERS

[75] Inventors: Masami Kiyoto; Makoto Anzai, both of Yokosuka City, Japan

[73] Assignee: Nissan Motor Company Limited, Yokohama City, Japan

[22] Filed: May 25, 1973

[21] Appl. No.: 363,792

[30] Foreign Application Priority Data
May 26, 1972 Japan.............................. 47-52346

[52] U.S. Cl................................. 343/9, 343/12 R
[51] Int. Cl........................... G01s 9/24, G01s 9/44
[58] Field of Search................... 343/9, 12 R, 5 DP

[56] References Cited
UNITED STATES PATENTS

| | | | |
|---|---|---|---|
| 3,168,735 | 2/1965 | Cartwright | 343/9 |
| 3,514,777 | 5/1970 | Woerrlein | 343/9 |
| 3,611,377 | 10/1971 | Rittenbach | 343/12 R |
| 3,634,860 | 1/1972 | Rittenbach | 343/12 R X |
| 3,750,171 | 7/1973 | Faris | 343/9 |

*Primary Examiner*—Maynard R. Wilbur
*Assistant Examiner*—G. E. Montone

[57] ABSTRACT

A multiple frequency doppler radar system for a vehicle passenger which detects a distance between the vehicle and an object in the vehicle path by transmitting two signals differing only slightly in frequency in advance of contact of the vehicle with the object, which is characterized by means for converting the doppler signals corresponding to the transmitted two signals into two rectangular signals, an exclusive OR gate which receives the two rectangular signals for producing pulses each appearing at a time period when either of the rectangular signals appears, and means for averaging the pulses from the exclusive OR gate so as to produce a distance signals representing the distance between the vehicle and the object.

6 Claims, 33 Drawing Figures

Fig. 4A
Fig. 4B
Fig. 4C
Fig. 4D
Fig. 4E
Fig. 4F
Fig. 4G
Fig. 4H
Fig. 4J

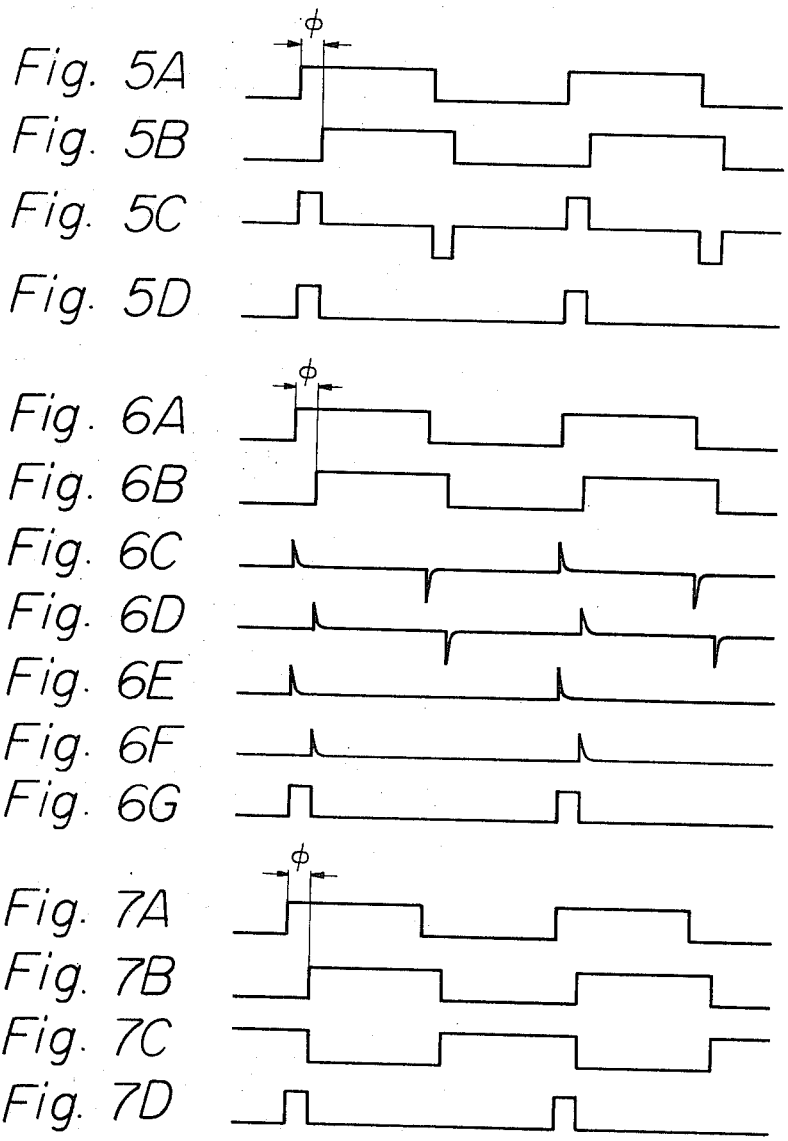

MULTIPLE FREQUENCY DOPPLER RADAR SYSTEM FOR VEHICLE PASSENGERS

The present invention relates to doppler radar system and in particular is concerned with a doppler radar system for vehicle passengers such as automobiles, which detects a distance between the vehicle and an object in the vehicle path and a velocity of the object relative to that of the vehicle in advance of contact of the vehicle with the object.

For the sake of effective protection of the operator on a vehicle, a doppler radar system is incorporated with a safety device of the vehicle. A multiple frequency radar system has been utilized for such doppler radar systems since the multiple frequency radar system is reliable in operation and simple in construction. The multiple frequency radar system is arranged to first transmit two separate signals differing only slightly in frequency and receives two echo signals which are reflected by an object in the vehicle path. The system then produces doppler signals corresponding to the two transmitted signals and detects a distance between the vehicle and the object in accordance with the phase difference between the two doppler signals and a relative velocity of the object in accordance with the frequency of either one of the doppler signals. The detection of the phase difference between the two doppler signals is usually achieved by first converting each of the doppler signals, which are sinusoidal, into a rectangular signal, and detecting the length of the time period between the leading or trailing edges of the rectangular signals.

It is, however, to be noted that the doppler signals are subjected to distortion because the intensity of the echo signals is instable when the object is near to the vehicle and furthermore external noises are superposed on the echo signals. The conventional phase difference detectors are incapable of correctly detecting the phase difference between the doppler signals when the doppler signals are distorted as above-mentioned.

It is accordingly a primary object of the present invention to provide a new and improved type of multiple frequency doppler radar system for a vehicle, which is reliable in operation.

It is another object of the present invention to provide a multiple frequency doppler radar system for a vehicle, which is simple in construction and accordingly economical.

It is a further object of the present invention to provide a multiple frequency doppler radar system for a vehicle, which is capable of correctly detecting a distance between the vehicle and an object in the vehicle path even if the echo signals from the object are unwantedly distorted.

A preferred embodiment of the present invention is illustrated in the accompanying drawings in which:

FIGS. 4A through 4J are diagrams illustrating waveforms of various signals appearing in the doppler radar system of FIG. 1.

FIGS. 5A through 7D are diagrams explaining various conventional methods for detecting the phase difference between the two doppler signals produced in the multiple frequency doppler radar system.

Figure 1:
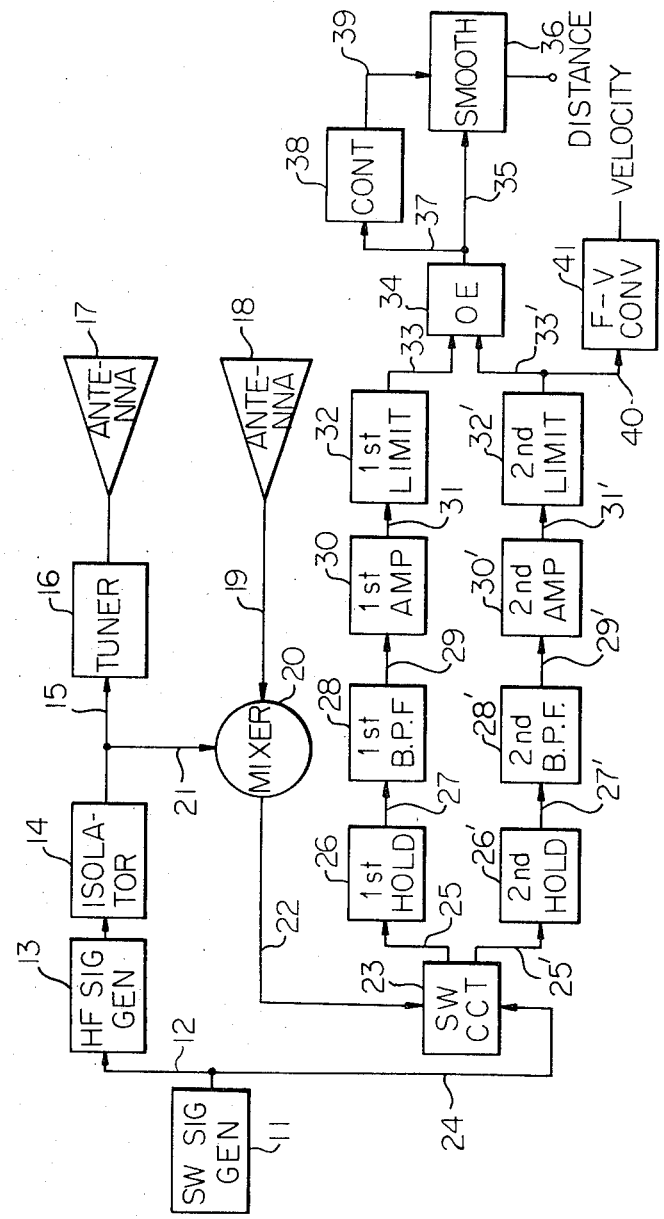
FIG. 1 is a schematic block diagram of a doppler radar system according to the present invention.

Referring now to the drawings and more particularly to FIG. 1 thereof, it will be seen a multiple frequency doppler radar system according to the invention, which is generally designated by a reference numeral 10. The system 10 includes a switching pulse signal generator 11 which generates a switching pulse signal which is applied through a line 12 to a high frequency signal generator 13. The high frequency signal generator 13 produces two pulse trains alternating with each other and carrying thereon a high frequency signal. The two pulse trains are applied through an isolator 14 and a line 15 to a tuner 16. The tuner 16 conveyes the two pulse trains to a transmitting antenna 17 which then transmits the two pulse signals in the direction of vehicle path. When an object is in the vehicle path, the transmitted pulse signals are reflected by the object and returned to a receiving antenna 18 as two echo signals. The receiving antenna 18 picks up the echo signals which are then applied through a line 19 to one input terminal of a mixer 20. The mixer 20 mixes the echo signals with the original pulse signals applied thereto through a line 21 so as to produce two doppler signals respectively corresponding to the two echo signals. The doppler signals are applied by way of a line 22 to a switching circuit 23 which selectively passes therethrough the two pulse trains in synchronism with the pulse signal applied thereto through a line 24. Therefore, one pulse signal modulated in amplitude by one of the doppler signal appears on one line 25 and another pulse signal modulated in amplitude by the other doppler signals appears on the other line 25'. The thus pulsated doppler signals on the lines 25 and 25' are applied to first and second holders 26 and 26' each of which is arranged to hold its output voltage at a level in accordance with its input during a predetermined time period. The output signals are applied through lines 27 and 27' to first and second band-pass filters 28 and 28'. Output signals of the first and second band-pass filters 28 and 28' are applied through lines 29 and 29' to first and second amplifiers 30 and 30' which sufficiently amplify the input signals thereof. The amplified signals are respectively applied through lines 31 and 31' to first and second limiters 32 and 32' which limit the amplitudes of the input signals. Thus, the two doppler signals on the lines 29 and 29' are converted into two rectangular signals. Output signals of the first and second limiters 32 and 32' are respectively applied through lines 33 and 33' to two input terminals of an exclusive OR gate 34. Output signal of the exclusive OR gate 34 is applied through a line 35 to a smoothing circuit 36 and through a line 37 to a controller 38. The smoothing circuit 36 averages the input pulse signals applied thereto. The controller 38 produces a control signal which is applied through a line 39 to the smoothing circuit 36. output signal from the smoothing circuit 36 represent the distance between the vehicle and the object. The output signal from the second limiter 32' is, on the other hand, applied through a line 40 to a frequency-voltage converter 41 which produces an output signal having a voltage proportional to the frequency of the rectangular signal on the line 40. Namely, the output signal of the converter 41 represents the velocity of the object relative to the vehicle speed.

Figure 2:
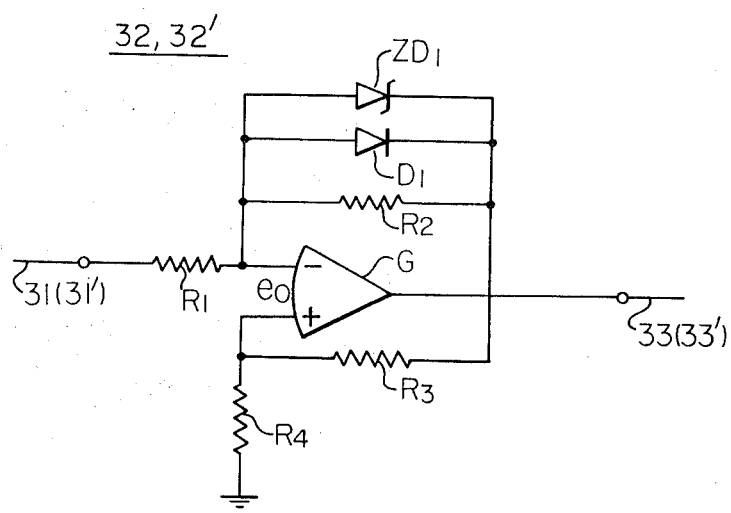
FIG. 2 is a diagram of a circuit arrangement for an element of the radar system shown in FIG. 1.

FIG. 2 illustrates in detail a preferred circuit arrangement for the first and second limiters 32 and 32'. The circuit arrangement includes a resistor $R_1$ with one terminal connected to an input terminal to be connected to the lines 31 or 31'. The other terminal of the resistor $R_1$ is connected to a negative input terminal of a logical amplifier G and also connected to one terminal of a resistor $R_2$, an anode of a diode $D_1$ and an anode of a Zener diode $ZD_1$. Output terminal of the amplifier G is connected to an output terminal to be connected to the line 33 or 33'. The other terminals of the resistor $R_2$, diode $D_1$ and Zener diode $ZD_1$ are connected to the output terminal. A positive input terminal of the amplifier G is connected through a resistor $R_4$ to the ground and through a resistor $R_3$ to the output terminal.

Figure 3:
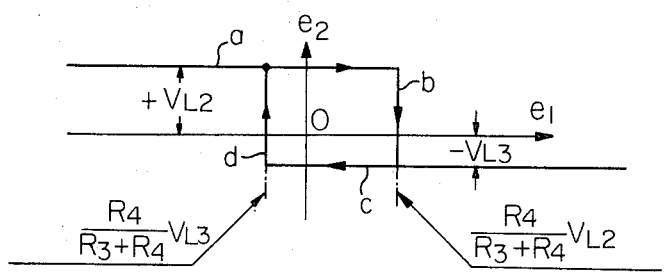
FIG. 3 is a diagram illustrating characteristics of the circuit arrangement of FIG. 2.

FIG. 3 illustrates a relationship between a voltage $e_2$ on the negative input terminal of the amplifier G and an output voltage $e_o$ of the amplifier G. As seen from this figure, the circuit arrangement of FIG. 2 has a hysteresis characteristic. The operation of the circuit arrangement of FIG. 2 will be explained in more detail hereinbelow with reference to FIG. 3.

The amplifier G is so arranged that when the amplifier G receives input voltages $e_1$ and $e_2$ through the positive and negative input terminals, the amplifier G produces the output voltage $e_o$ which suffices the following formulae:

$$e_o = +V_{L2} \text{ when } e_1 < e_2, \text{ and}$$

$$e_o = -V_{L3} \text{ when } e_1 < e_2$$

where the voltages $+V_{L2}$ and $-V_{L3}$ are defined by the diodes $ZD_1$ and $D_1$.

When the input voltage $e_i$ is increased from the negative infinity ($-\infty$) as indicated by an arrow $a$ within a range that the voltage $e_1$ is smaller than the voltage $e_2$, the output voltage $e_o$ is maintained at the voltage $+V_{L2}$ and accordingly the voltage $e_1$ is expressed as $$e_1 = R_4/(R_3 + R_4) e_o = + R_4/(R_3 + R_4) V_{L2}$$

when the voltage $e_2$ exceeds the voltage $e_1$, the output voltage $e_o$ slightly lowers thereby to cause the voltage $e_1$ to reduce. Through this cycle, the output voltage $e_o$ rapidly reduces to the voltage $-V_{L3}$ as indicated by an arrow $b$ in FIG. 3 when the voltage $e_2$ exceeds the voltage $R_4/(R_3 + R_4) V_{L2}$. When, thereafter, the input voltage $e_i$ is further increased, the output voltage $e_o$ is maintained at the voltage $-V_{L3}$.

When, on the contrary, the input voltage $e_i$ is reduced from the positive infinity ($+\infty$) but the voltage $e_1$ is larger than the voltage $e_2$, the voltage output voltage $e_o$ is maintained at the voltage $-V_{L3}$ as indicated by the arrow $c$ and the voltage $e_1$ equals to $- R_4/(R_3+R_4) V_{L3}$. When the voltage $e_2$ lowers below the voltage $- R_4/(R_3 + R_4) V_{L3}$, the output voltage $e_o$ rapidly reduces to the voltage $+V_{L2}$ as indicated by an arrow $d$.

Referring now to FIG. 4, the operation of the system 10 of FIG. 1 will be explained hereinbelow.

Figures 4A, 4B, 4C, 4D, 4E, 4F, 4G, 4H, 4J:
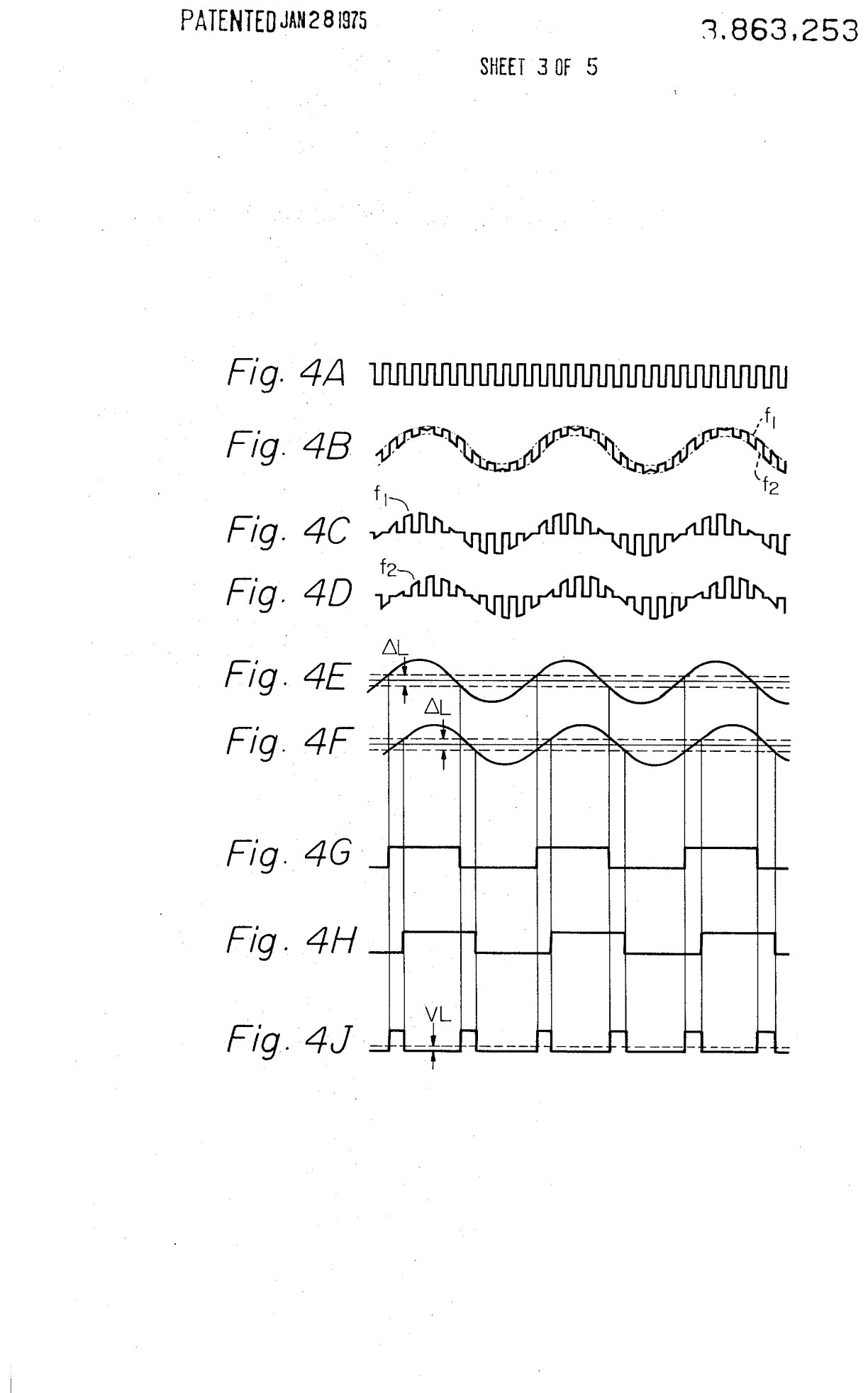

The switching pulse signal generated by the switching pulse signal generator 11 has, for example, a waveform as shown in FIG. 4A. The two echo signals picked up by the receiving antenna 18 are converted into a signal which contains two doppler signals as indicated by phantom lines $f_1$ and $f_2$. The two doppler signals are applied to the switching circuit 23 which divides the signal into two doppler signals respectively having waveforms as shown in FIGS. 4C and 4D. As seen from the figures, the doppler signals are respectively sampled by two pulse trains which appear alternatively with each other. The two doppler signals are converted by the first and second holders 26 and 26' and the first and second band-pass filters 28 and 28' into two sinusoidal doppler signals as shown in FIGS. 4E and 4F. Being apparent from the figures, the two doppler signals are differed in phase in accordance with the distance between the vehicle and the object. The two doppler signals are sufficiently amplified by the first and second amplifiers 30 and 30' and thereafter limited in amplitude by the first and second limiters 32 and 32', whereby the two doppler signals are respectively converted into two rectangular signals as illustrated in FIGS. 4G and 4H. It is to be noted that since the limiter 32 and 32' have hysteresis characteristics as described above, each rectangular signal rises up and down when the intensity of the corresponding doppler signal exceeds a value $\Delta L/2$ and lowers below a value $-\Delta L/2$, as shown in the figures. The value $\Delta L$ corresponds to the width of the hysteresis as shown in FIG. 3. The two rectangular signals are delivered to the exclusive OR gate 34 which then produces pulse train consisting of pulses each appearing during time period between the leading edges and trailing edges of the two rectangular signals as illustrated in FIG. 4J. The pulse trains is then averaged or smoothed by the smoothing circuit 36 which therefore produces a d-c signal with a voltage $V_L$ as indicated by a broken line in FIG. 4J. The d-c represents the distance between the vehicle and the object.

Referring now to FIGS. 5A through 7D, various conventional method for detecting the phase difference between two sinusoidal signals will be explained hereinbelow.

In one method, the two sinusoidal signals are first converted by a usual manner into two rectangular signals as shown in FIGS. 5A and 5B. One of the two rectangular signals is subtracted by the other rectangular signal so as to produce a pulse train having waveform as shown in FIG. 5C. Negative pulses of the pulse train are removed through rectification so that a pulse signal is produced which has waveform as shown in FIG. 5D. The pulse signal is then averaged to produce a d-c voltage proportional to the phase difference $\phi$ between the two original sinusoidal signal. This method makes possible to detect a phase difference from 0° to 180°.

In another conventional method, the two sinusoidal signal are first converted into two rectangular signals as shown in FIGS. 6A and 6B in a manner similar to that of the above-mentioned method. When the two sinusoidal signals are shifted from each other through an angle $\phi$, the leading edges of the two rectangular signals are apart from each other by a time period corresponding to the angle $\phi$. The rectangular signals are then differentiated so as to produce two spike pulse trains as shown in FIGS. 6C and 6D. The spike pulse trains are then rectified so as to produce spike pulse trains shown in FIGS. 6E and 6F. The spike pulses are applied a flip-flow circuit so as to produce pulses which respectively lasting during time duration from one to another spike pulses as illustrated in FIG. 6G. The pulses are averaged to produce a d-c voltage signal representing the phase difference between the original sinusoidal signals. This method makes possible to detect a phase difference from 0° to 360°.

In a further conventional method, the two sinusoidal signals are respectively converted into two rectangular signals as shown in FIGS. 7A and 7B. One rectangular signal of FIG. 7B is then inverted in phase into another rectangular signal as shown in FIG. 7C. The rectangular signal of FIG. 7A and the inverted rectangular signal are logically "anded" so as to produce a pulse signal as shown in FIG. 7D. The pulse signal is then averaged to produce a d-c signal representing the phase difference.

It is now to be noted that as long as the sinusoidal signals are not distorted, the above-mentioned conventional methods can be performed to correctly detect the phase difference. When, however, the two sinusoidal signals are distorted, the detection of the conventional methods is inevitably incorrect.

The radar system of FIG. 1 according to the invention is capable of correctly detecting the phase difference between the two doppler signals even if the doppler signals are unwantedly distorted.

Referring now to FIGS. 8A through 8E, the operation of the phase difference detection of the doppler radar system of FIG. 1 according to the invention will be described hereinbelow.

Figure 8A:
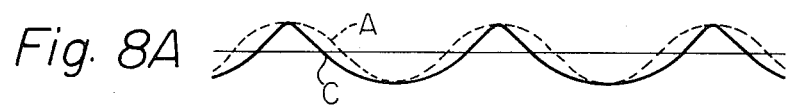
FIGS. 8A through 8E are diagrams for the explanation of the phase difference detecting assembly of the radar system of FIG. 1.

When the echo signals are not distorted, the output signal of the band-pass filter 28 or 28' has such a sinusoidal waveform as indicated by a broken line A in FIG. 8A. In this instance, the output signals of the limiters 32 and 32', or the rectangular signals, appear in such a manner as indicated by broken lines B and B' in FIGS. 8B and 8C and accordingly the exclusive OR gate 34 repeatedly produces pulses each having pulse duration corresponding to the phase difference between the rectangular signals as shown in FIG. 8D.

Figure 8B:
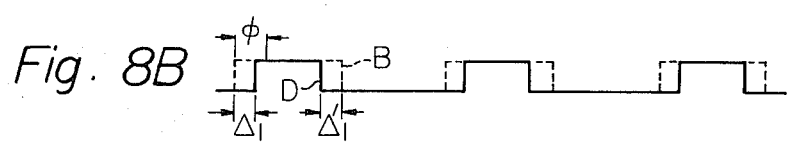
Figure 8C:
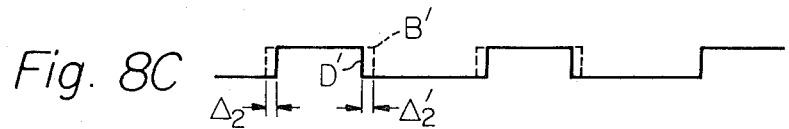
Figure 8D:
Figure 8E:
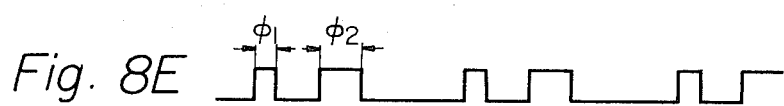

When the echo signals are distorted due to, for example, a short distance between the vehicle and the object as indicated by a solid line C in FIG. 8A, the rectangular signals from the limiters 32 and 32' appear on the lines 33 and 33' which have waveforms as indicated by solid lines D and D' in FIGS. 8B and 8C. Therefore, the exclusive OR gate produces pulses with various pulse duration such as $\phi_1$ and $\phi_2$ respectively corresponding to the time periods between the leading and trailing edges of the rectangular signals D and D'.

When it is assumed that the phase shifts between the rectangular signals B and D at the leading and trailing edges are respectively $\Delta_1$ and $\Delta'_1$, and those between the rectangular signals are also $\Delta_2$ and $\Delta'_2$, the pulse widthes $\phi_1$ and $\phi_2$ are expressed as:

$$\phi_1 = \phi - \Delta_1 + \Delta_2$$
$$\phi_2 = \phi - \Delta'_1 + \Delta'_2$$

Hence, $$\phi + \phi_2 = 2\phi - (\Delta_1 - \Delta'_1) + (\Delta_2 - \Delta'_2)$$

In practical circumstances, it can be assumed that the following equations hold:

$$\Delta_1 - \Delta'_1 = \Delta_2 - \Delta'_2 = 0$$

Accordingly, $$\phi_1 + \phi_2 = 2\phi$$

Since, therefore, the output signal of the exclusive OR gate 34 is averaged by the smoothing circuit 36, the distance signal of the radar system of the invention is not influenced by the phase shifts $\Delta_1$, $\Delta'_1$, $\Delta_2$ and $\Delta'_2$. Nemely, the radar system of the invention is capable of correctly detecting the distance between the vehicle and the object even if the echo signals are distorted.

On the other hand, it has been another problem that when the conventional radar systems are utilized for the safety devices of a motor vehicle, those systems unwantedly respond to a negligible signal such as echo signals from the road surface or such a small object as not to be detected, or the ignition noises from the engine. Since, however, the limiters 32 and 32' of the radar system of the invention produce output signals only when the output signal of the amplifiers 30 and 30' exceeds the predetermined value $\Delta L/2$, the radar system of the invention is not adversely affected by the negligibly low level signals.

Figure 9:
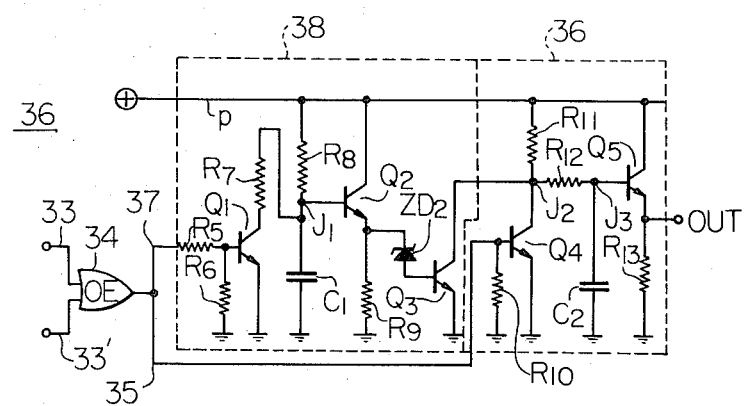
FIG. 9 is a diagram illustrating circuit arrangement for an element of the radar system of FIG. 1.

In FIG. 9, there are illustrated preferred circuit arrangements for the smoothing circuit 36 and the controller 38 of the radar system of FIG. 1. The circuit arrangement for the controller 38 includes a resistor $R_5$ with one terminal connected through the line 37 to the output terminal of the exclusive OR gate 34. The base of a transistor $Q_1$ is connected to the other terminal of the resistor $R_5$ and through a resistor $R_6$ to the ground. The emitter of the transistor $Q_1$ is grounded. The collector of the transistor $Q_1$ is connected by way of resistors $R_7$ and $R_8$ to a positive bus line P. A joint $J_1$ between the resistors $R_7$ and $R_8$ is connected to a storage capacitor $C_1$ which is in turn grounded. The joint $J_1$ is also connected to the base of a transistor $Q_2$ the emitter of which is grounded through a resistor $R_9$. The collector of the transistor $Q_2$ is connected direct to the bus line P. The emitter of the transistor $Q_2$ is connected to the cathode of a Zener diode $ZD_2$ the anode of which is connected to the base of a transistor $Q_3$. The emitter of the transistor $Q_3$ is directly grounded. The circuit arrangement for the smoothing circuit 36 includes a transistor $Q_4$ which has the base connected to the output terminal of the exclusive OR gate 34 and also connected through a resistor $R_{10}$ to the ground. The emitter of the transistor $Q_4$ is grounded directly and the collector of the transistor $Q_4$ is connected through a resistor $R_{11}$ to the bus line P. This portion including the transistor $Q_4$ functions as an inverter. A resistor $R_{12}$ has one terminal connected by way of a joint $J_2$ to the collector of the transistor $Q_4$ and the other terminal connected to one terminal of a integrating capacitor $C_2$ the other terminal of which is grounded. A joint $J_3$ between the resistor $R_{12}$ and the capacitor $C_2$ is connected to the base of a transistor $Q_5$ the collector of which is directly connected to the bus line P. The emitter of the transistor $Q_5$ is connected to a resistor $R_{13}$ which is in turn grounded. An output terminal of the circuit 36 is connected to the emitter of the transistor $Q_5$.

When, in operation, the output pulse signal from the exclusive OR gate 34 is applied by way of the line 35 to the base of the transistor $Q_4$, an inverted pulse signal appears at the joint $J_2$, the inverted signal being averaged or integrated by the resistor $R_{12}$ and the capacitor $C_2$. The integrated signal is picked up as the distance signal by way of the emitter follower circuit of the transistor $Q_5$.

It will be understood that as long as the output signal of the exclusive OR gate 34 intermittently takes positive values or continues to be positive or "ON" condition, the storage capacitor $C_1$ is so discharged as to make non-conductive the transistors $Q_2$ and $Q_3$.

When, on the contrary, the exclusive OR gate 34 produces no output signal, the storage capacitor $C_1$ is completely charged up through the resistor $R_8$ thereby to cause the transistors $Q_2$ and $Q_3$ to become conductive. Since the transistor $Q_3$ continues to be conductive, the potential at the joint $J_2$ is maintained zero and accordingly the capacitor $C_2$ is completely discharged even if the transistor $Q_4$ is non-conductive. Namely, the smoothing circuit 36 is prevented by the controller 38 from producing an erroneous output signal when there is no object on the vehicle path and the exclusive OR gate 34 produces no output signal.

It is, in this instance, to be noted that a usual hysteresis type comparator utilized for the limiters 34 and 34' of the radar system produces "ON" or "OFF" signal when the comparator is not energized. Therefore, the smoothing circuit 36 is subject to erroneous operation when there is no object on the vehicle path and accordingly no echo signals appear. The controller 38, however, prevents the smoothing circuit 36 from producing an erroneous distance signal as above-described.

It should be now appreciated that the multiple frequency doppler radar system of the invention is reliable in operation even though it is simple in construction and accordingly economical.

While specific embodiments of the invention have been shown and described in detail to illustrate the application of the principles of the invention, it will be understood that the invention may be embodied otherwise without departing from such principles.

What is claimed is:

1. In a doppler radar system for a vehicle which detects a distance between the vehicle and an object in the vehicle path by transmitting two separate signals differing only slightly in frequency, the improvement comprises:

first means for converting each of the doppler signals corresponding to the transmitted separate two signals into a pulse signal consisting of pulses appearing during alternative half waves of said each of the doppler signals;

second means for producing a pulse train consisting of a plurality of pulses each appearing at a time period when either one of the two pulse signals appears; and third means for averaging said pulse train so as to produce a distance signal representing the distance between the vehicle and the object.

2. The invention as claimed in claim 1, in which said first means includes amplifying means for amplifying said doppler signals, and limit means for limitting the amplitudes of the amplified doppler signals.

3. The invention as claimed in claim 2, in which said limit means adapted to produce a pulse rising up when the intensity of the input signal exceeds a predetermined value and falling down when the intensity of the input signal lowers a predetermined value.

4. The invention as claimed in claim 1, in which said second means includes an exclusive OR gate means connected to said first means.

5. The invention as claimed in claim 1, in which said third means includes an integrator consisting of a resistor and a capacitor serially connected to said resistor.

6. The invention as claimed in claim 1, which further comprises:

fourth means for disabling said third means when one pulse of said pulse train from said second means lasts over a predetermined time period.

* * * * *